US008150268B1

(12) United States Patent
Leeb et al.

(10) Patent No.: US 8,150,268 B1
(45) Date of Patent: Apr. 3, 2012

(54) MULTI-FREQUENCY DUAL-USE SYSTEM

(75) Inventors: Steven B. Leeb, Belmont, MA (US);
Roderick Hinman, Kailua-Kona, HI (US); Al-Thaddeus Avestruz, Waltham, MA (US); Gary Livshin, Burlington, MA (US); John Rodriguez, Somerville, MA (US); Nels Peterson, Bellevue, WA (US); Elmer C. Lupton, Charlestown, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 946 days.

(21) Appl. No.: 11/497,951

(22) Filed: Aug. 2, 2006

Related U.S. Application Data

(63) Continuation-in-part of application No. 10/617,817, filed on Jul. 14, 2003, now abandoned, and a continuation-in-part of application No. 10/161,458, filed on May 31, 2002, now Pat. No. 6,954,591, which is a continuation of application No. 09/291,709, filed on Apr. 14, 1999, now Pat. No. 6,400,482, said application No. 10/617,817 and a continuation-in-part of application No. 10/201,378, filed on Jul. 23, 2002, now Pat. No. 6,794,831, is a continuation of application No. 09/770,806, filed on Jan. 26, 2001, now Pat. No. 6,426,599, which is a continuation of application No. 09/291,706, filed on Apr. 14, 1999, now Pat. No. 6,198,230.

(60) Provisional application No. 60/402,434, filed on Aug. 9, 2002, provisional application No. 60/416,357, filed on Oct. 4, 2002, provisional application No. 60/450,072, filed on Feb. 25, 2003, provisional application No. 60/476,876, filed on Jun. 6, 2003, provisional application No. 60/081,866, filed on Apr. 15, 1998, provisional application No. 60/108,287, filed on Nov. 13, 1998, provisional application No. 60/115,374, filed on Jan. 11, 1999, provisional application No. 60/308,486, filed on Jul. 25, 2001, provisional application No. 60/311,037, filed on Aug. 9, 2001, provisional application No. 60/326,277, filed on Oct. 1, 2001, provisional application No. 60/338,912, filed on Nov. 26, 2001, provisional application No. 60/337,491, filed on Nov. 26, 2001, provisional application No. 60/341,191, filed on Dec. 7, 2001, provisional application No. 60/353,253, filed on Feb. 1, 2002, provisional application No. 60/367,393, filed on Mar. 25, 2002, provisional application No. 60/191,725, filed on Mar. 24, 2000, provisional application No. 60/081,866, filed on Apr. 15, 1998, provisional application No. 60/108,287, filed on Nov. 13, 1998, provisional application No. 60/115,374, filed on Jan. 11, 1999, provisional application No. 60/704,799, filed on Aug. 2, 2005, provisional application No. 60/794,188, filed on Apr. 21, 2006, provisional application No. 60/794,674, filed on Apr. 24, 2006.

(51) Int. Cl.
*H04B 10/10* (2006.01)
(52) U.S. Cl. .................................................. 398/172
(58) Field of Classification Search .................. 398/172
See application file for complete search history.

(56) References Cited

U.S. PATENT DOCUMENTS

| 1,356,686 | A | * | 10/1920 | Arnold | 116/20 |
| 1,936,400 | A | * | 11/1933 | Langmuir | 398/125 |
| 3,697,941 | A | * | 10/1972 | Christ | 340/991 |
| 5,020,155 | A | * | 5/1991 | Griffin et al. | 398/130 |
| 5,602,668 | A | * | 2/1997 | Kuchta | 398/172 |
| 5,838,116 | A | * | 11/1998 | Katyl et al. | 315/307 |
| 7,006,768 | B1 | * | 2/2006 | Franklin | 398/127 |

* cited by examiner

*Primary Examiner* — Leslie Pascal

(57) ABSTRACT

The present invention relates to the dual-use of radiation, for example, but not limited to, visible or infrared light, for both a conventional application, e.g., illumination, combined with the additional or "dual-use" application of transmitting information without wires.

13 Claims, 6 Drawing Sheets

Block Diagram of a multi-frequency dual-use ballast

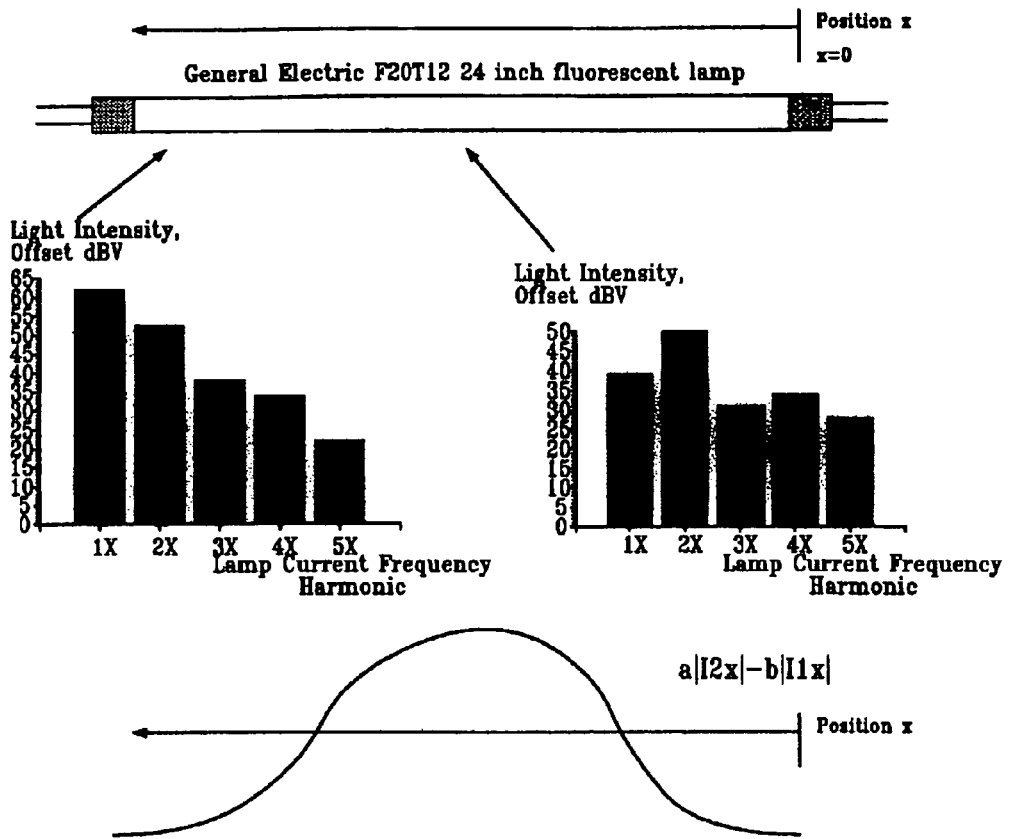
Figure 1: Light intensity from a fluorescent lamp tube as a function of lamp position and current frequency.

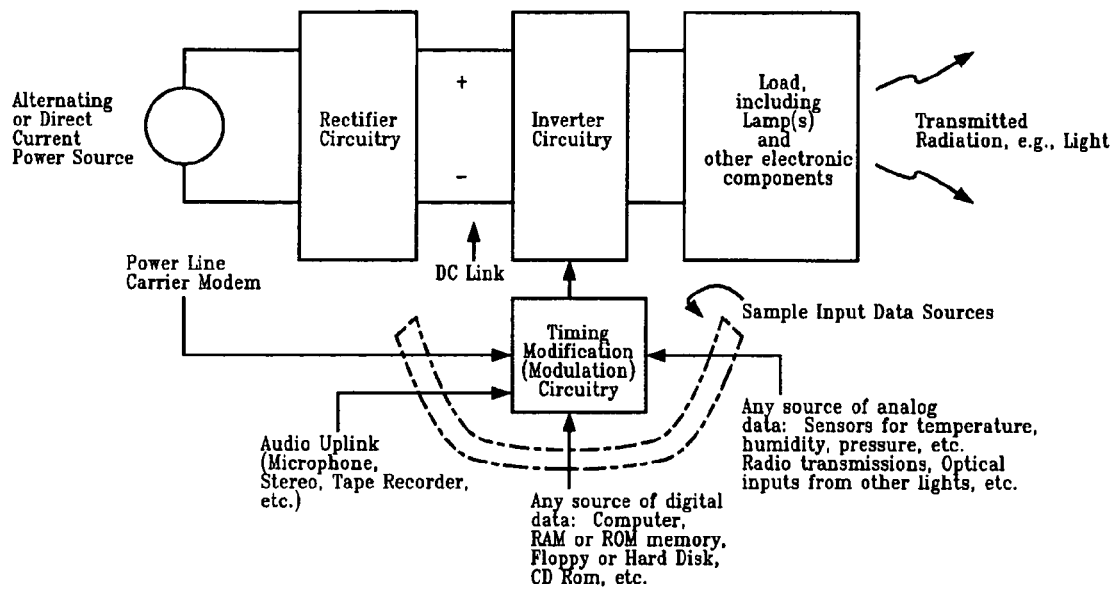
Figure 2: Block Diagram of a multi-frequency dual-use ballast

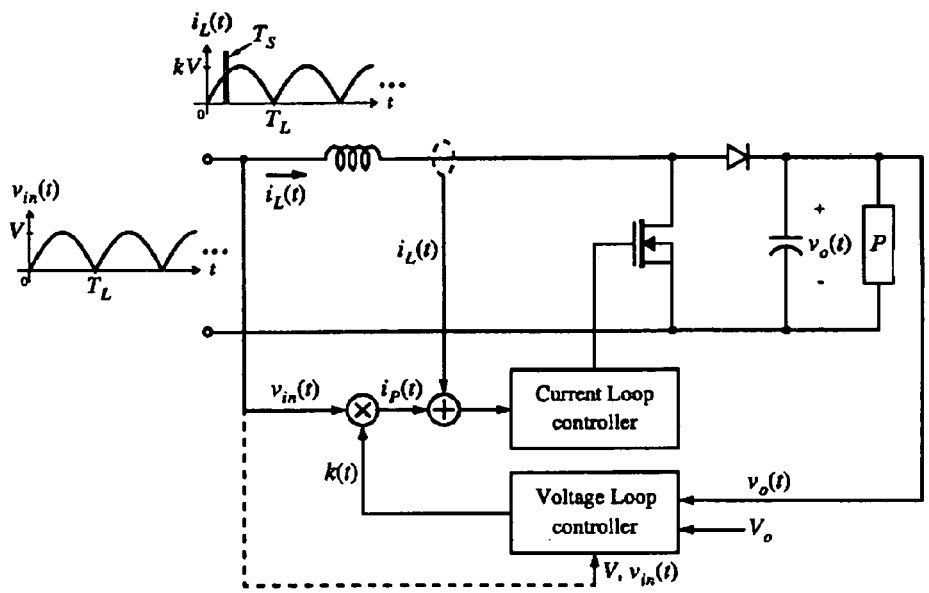
Figure 3: Boost power factor correction rectifier circuit
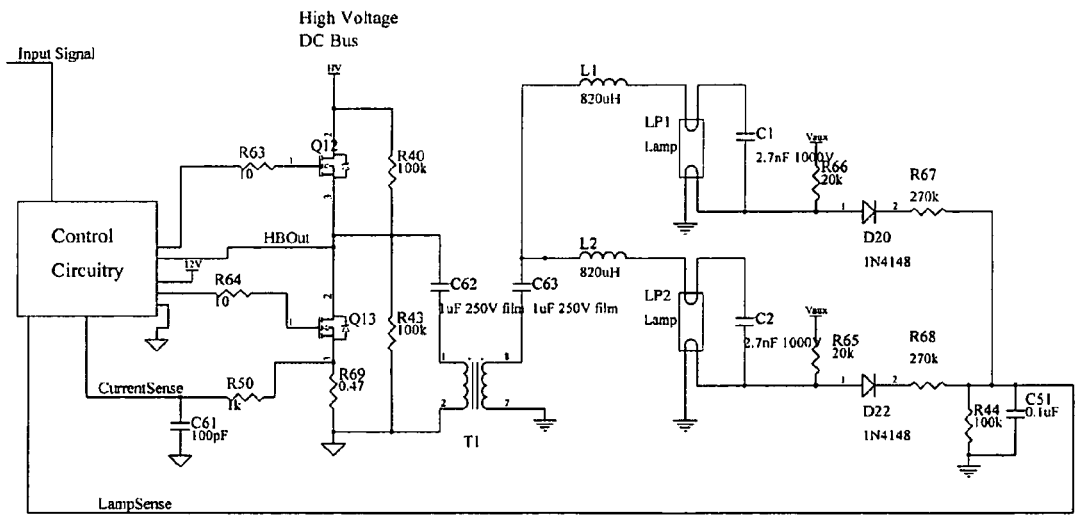
Figure 4: Talking Lights inverter circuit

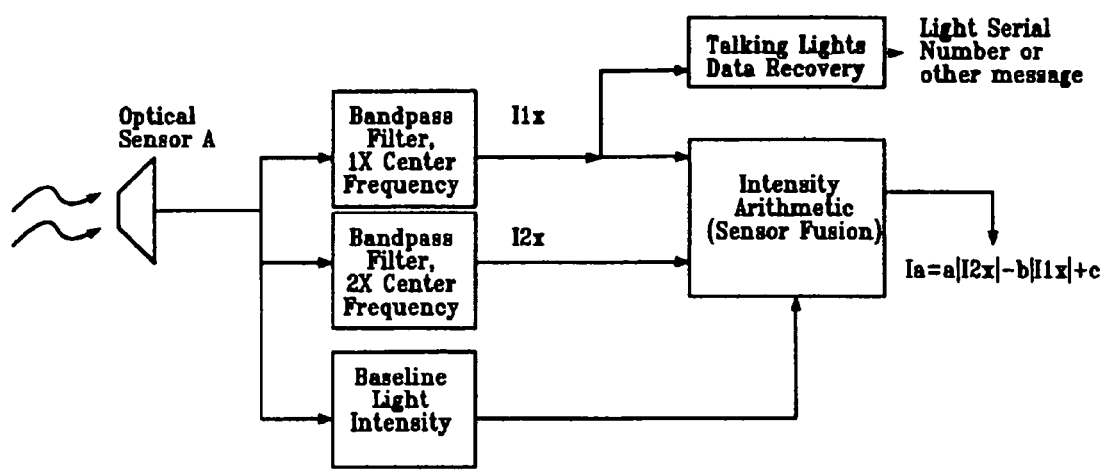
Figure 5: "Front-end" for locating receiver.

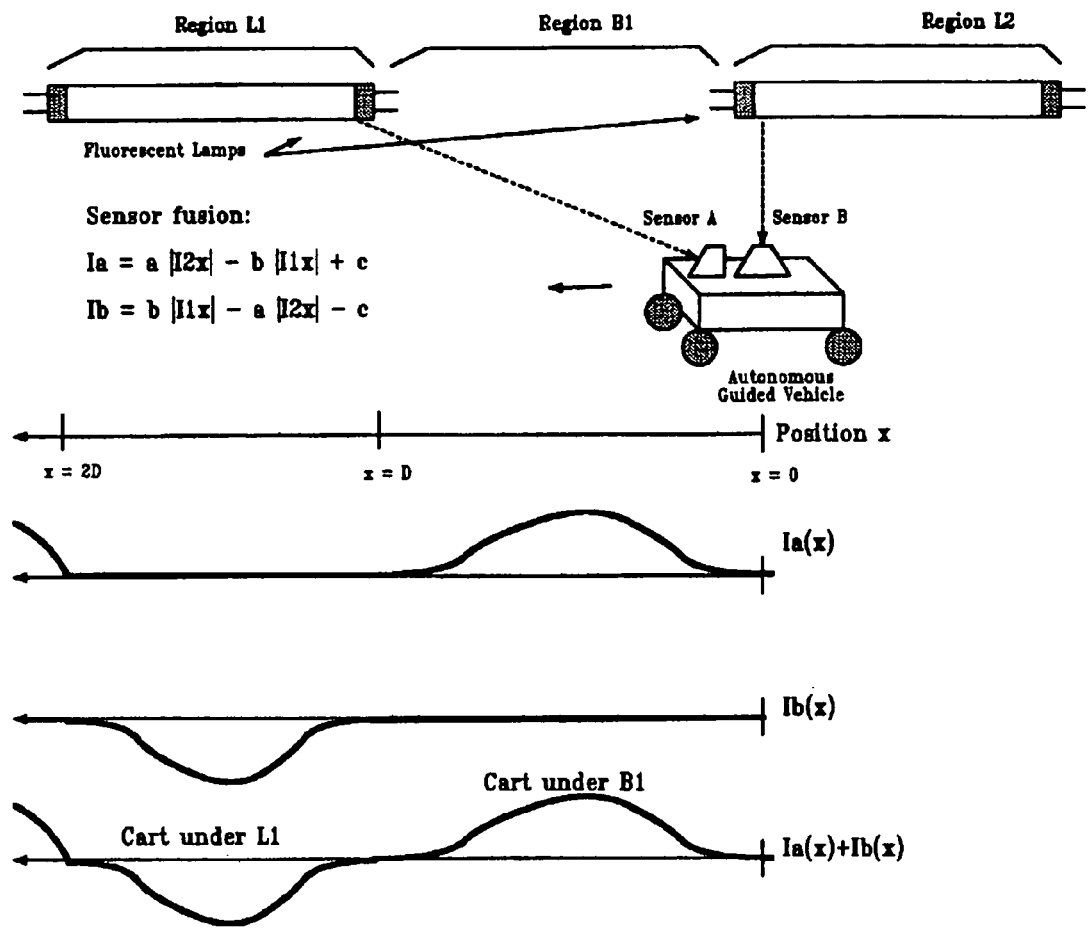
Figure 6: Locating position in the x-dimension.

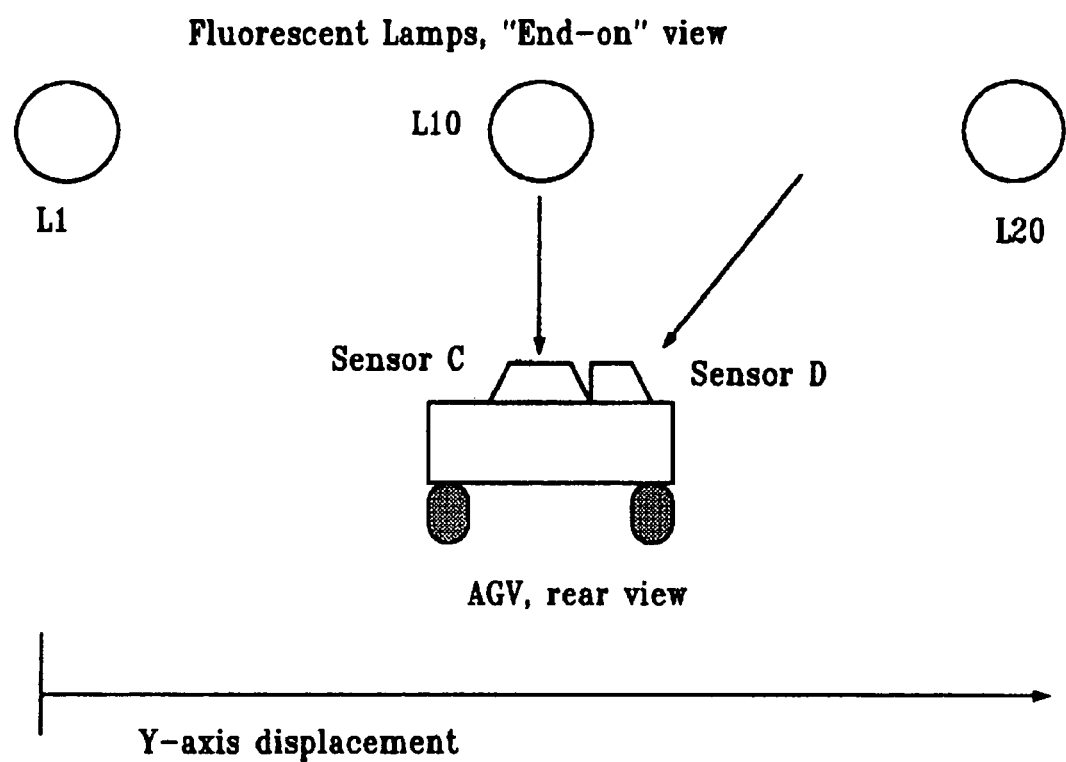
Figure 7: Position determination in the y-axis.

MULTI-FREQUENCY DUAL-USE SYSTEM

PRIORITY CLAIMS

This application is a continuation-in-part of, incorporates by reference, and claims priority to U.S. patent application Ser. No. 10/617,082 (now abandoned) filed Jul. 10, 2003 which claims priority to and incorporates by reference U.S. Provisional Patent Applications 60/402,434 filed Aug. 9, 2002, 60/416,357 filed Oct. 4, 2002, 60/450,072 filed Feb. 25, 2003, and 60/476,876 filed Jun. 6, 2003, which is a continuation in part, claims priority to and incorporates by reference U.S. patent application Ser. No. 10/161,458 filed on May 31, 2002, now U.S. Pat. No. 6,954,591 issued Oct. 11, 2005, which is a continuation of, claims priority to and incorporates by reference U.S. patent application Ser. No. 09/291,709, filed Apr. 14, 1999, now U.S. Pat. No. 6,400,482, which claims priority to U.S. Provisional Patent Applications 60/081,866 dated Apr. 15, 1998, 60/108,287 dated Nov. 13, 1998, and 60/115,374 dated Jan. 11, 1999.

U.S. patent application Ser. No. 10/617,082 (now abandoned) is also a continuation-in-part of, claims priority to and incorporates by reference U.S. patent application Ser. No. 10/201,378 filed on Jul. 23, 2002, now U.S. Pat. No. 6,794,831 issued Sep. 21, 2004, which claims priority to and incorporates by reference U.S. Provisional Patent Applications 60/308,486 filed Jul. 25, 2001, 60/311,037 filed Aug. 9, 2001, 60/326,277, filed Oct. 1, 2001, 60/338,912 filed Nov. 26, 2001, 60/337,491 filed Nov. 26, 2001, 60/341,191 filed Dec. 7, 2001, 60/353,253 filed Feb. 1, 2002, and 60/367,393 filed Mar. 25, 2002, which is a continuation of and claims priority to and incorporates by reference U.S. patent application Ser. No. 09/770,806 filed Jan. 26, 2001, now U.S. Pat. No. 6,426,599, issued Jul. 30, 2002, which claims priority to and incorporates by reference U.S. Provisional Patent Application 60/191,725 filed Mar. 24, 2000, which is a continuation of, claims priority to and incorporates by reference U.S. patent application Ser. No. 09/291,706 filed Apr. 14, 1999 now U.S. Pat. No. 6,198,230 issued Mar. 6, 2001, which claims priority to U.S. Provisional Patent Applications 60/081,866 dated Apr. 15, 1998, 60/108,287 dated Nov. 13, 1998, and 60/115,374 dated Jan. 11, 1999.

This application (U.S. application Ser. No. 11/497,951) claims priority to U.S. Provisional Patent Applications 60/704,799 dated Aug. 2, 2005, 60/794,188 dated Apr. 21, 2006 and 60/794,674 dated Apr. 24, 2006. The following patents and patent applications are incorporated in their entirety herein by reference. U.S. Provisional Patent Applications 60/402,434 filed Aug. 9, 2002, 60/416,357 filed Oct. 4, 2002, 60/450,072 filed Feb. 25, 2003 and 60/476,876 filed Jun. 6, 2003 .

U.S. patent application Ser. No. 10/617,082 filed Jul. 10, 2003

U.S. patent application Ser. No. 10/161,458 filed on May 31, 2002 now U.S. Pat. No. 6,954,591issued Oct. 11, 2005, U.S. patent application Ser. No. 09/291,709, filed Apr. 14, 1999, now U.S. Pat. No. 6,400,482, issued Jun. 4, 2002.

U.S. patent application Ser. No. 10/201,378 filed on Jul. 23 2002 now U.S. Pat. No 6.794 831 issued Sep. 21, 2004.

U.S. Provisional Patent Applications 60/308,486 filed Jul. 25, 2001, 60/311,037 filed Aug. 9, 2001, 60/326,277, filed Oct. 1, 2001, 60/338,912 filed Nov. 26, 2001, 60/337,491 filed Nov. 26, 2001, 60/341,191 filed Dec. 7, 2001, 60/353,253 filed Feb. 1, 2002 and 60/367,393 filed Mar. 25, 2002, U.S. patent application Ser. No. 09/770,806 filed Jan. 26, 2001 now U.S. Patent 6,426,599 issued Jul. 30, 2002 U.S. Provisional Patent Application 60/191,725 filed March 24, 2000, U.S. patent application Ser. No. 09/291,706 filed Apr. 14, 1999 now U.S. Pat. No. 6,198,230 issued March 6, 2001. U.S. patent application Ser. No. 09/292,126 filed Apr. 14, 1999 now U.S. Pat. No. 6,504,633 issued Jan. 7, 2003, U.S. Provisional Patent Applications 60/081,866 dated Apr. 15, 1998, 60/108,287 dated Nov. 13, 1998, 60/115,374 dated Jan. 11, 1999, 60/704,799 dated Aug. 2, 1005, 60/794,188 dated Apr. 21 2006 and 60/794,674 dated Apr. 24, 2006.

GOVERNMENT SUPPORT

This invention was made with government support under grant number DMI-9860329 awarded by the National Science Foundation and other government grants and contracts. The Government may have certain rights to some of the claims in the invention.

FIELD OF THE INVENTION

This invention relates to the dual-use of radiation, for example, but not limited to, visible or infrared light, for both a conventional application, e.g., illumination, combined with the additional or "dual-use" application of transmitting information without wires. The present invention additionally relates to simultaneous dual-use transmission using two or more frequencies of radiation, e.g., two colors in visible light, or one visible light and one infrared light, or one visible light and one radio source. The present invention further relates to electronic ballast circuits for electric discharge lamps, e.g., fluorescent lamps. The present invention further relates to the application of a time-varying, modulated current through the lamp to produce electronically detectable variations in the lamp light. The present invention further relates to coding information in variations in the lamp light for purposes of transmitting all kinds of information, including, but not limited to, audio, textual, and graphical signals. The present invention additionally relates to dual-use transmission using multiple, different coding schemes, e.g., two or more different modulation carrier frequencies, as distinguished from the frequency, e.g., color, of the radiation itself. The present invention further relates to efficient coding schemes to maximize the bandwidth or information transfer capability of the optical data channel. The present invention further relates to efficient power electronic circuits capable of producing modulated currents in a lamp with high power efficiency, maximum data rate, and the possibility of incorporating needed safety features such as galvanic isolation. The present invention further relates to the construction of receivers for detection of the modulated information in the lamp light.

BACKGROUND OF THE INVENTION

An era of "transceiver bloat" is beginning. Information systems like the World-Wide Web, Bluetooth and IEEE802.11b networks, cellular and satellite communications, and IRDA communications ports are part of the increasingly sophisticated, wireless information network that we use to exchange information. The impact of this communication web is pervasive in our lives, but the expense of installing and maintaining the transmitters and receivers in a transceiver network remains significant. This expense is especially apparent where the economies of mass production fail. Cellular coverage becomes spotty in thinly populated areas. The cost of maintaining a satellite constellation can limit the availability of the global positioning system at different geographic locations and times. Signals from GPS are difficult or impossible to acquire indoors, and often require additional or modified electronics to function at all in a building. Assistive technologies like captioning systems for the hard-of-hearing or even Braille signs for the blind must be mandated in many commercial environments by law, e.g., the Americans' with Disabilities Act.

When economies of scale do apply, we tolerate the intrusive and often expensive installation and maintenance of transmitters, e.g., Bluetooth transmitters, cellular phone towers, and wired data ports, on the promise that the connectivity provided by these systems justifies their addition. Furthermore, adding additional features to a network, e.g., position locating in a communication network, may bring additional technical and economic complications.

The present invention relates to a communication network based on frequency-modulated radiation. Among other possibilities, it enables existing lighting systems to be used to transmit the signal. Because this system can take advantage of existing installed light fixtures, uses little or no extra power, and can operate with little or no extra wiring, it provides desirable communications capabilities without the "bloat," i.e., without special installation efforts beyond normal maintenance or installation activities for lighting products, for example. In one embodiment, the invention is "dual-use," preserving one feature, e.g., illumination, while adding another, e.g., communication. Both functions, communication and illumination (and potentially other functions) are preserved, available at all times in principle without interfering with each other. The invention as applied to lighting eliminates undesirable visual flicker and other distracting optical phenomena in the system and so allows continuous use of the lighting fixtures as lighting while also providing the medium for communication. It allows analog, digital or analog/digital data to be sent and received. It increases the bandwidth available to transmit data, and it enables a number of applications to be performed using the system. Improvements made in the current invention could result in unprecedented performance advantages in the operation and implementation of lamp transceiver systems.

SUMMARY OF THE INVENTION

In one embodiment, the system of the present invention comprises a dual-use transmitter of radiation. In a dual-use transmitter, radiation is provided, for example, for both a conventional application, e.g., illumination, combined with at least one other dual-use application of transmitting information without wires. Both the conventional application, e.g., illumination, and the other application, e.g., optical information transmission, may occur simultaneously with no interruption or disruption of either function. Therefore, the system of the present invention may have the property of "dual-use". Simultaneous dual-use transmission may be conducted using two or more frequencies of radiation, e.g., two colors in visible light, or one visible light and one infrared light, or one visible light and one radio source. Therefore, the system of the present invention may further be referred to as having the property of "multi-frequency." In one embodiment of the invention, the transmitter may emit two or more colors or frequencies in physically distinct or geometrically different ways. A receiver, which is another part of the invention the invention, is capable of both decoding information from the transmitted radiations, and also calculating position with respect to the transmitting source using the geometrically distinct multiplicity of radiation available from the transmitter. The receiver may be in contact with other computing devices via wireless or networked means well known in the art, e.g., an internet connection, Bluetooth, or WiFi, to provide information exchange between other computing resources on a communication network. The receiver and one or more transmitters form a network that provides information on multiple redundant channels that can be used for enhanced transmission reliability and position location, or can be used to transmit multiple redundant streams of information simultaneously, among other possible applications.

In another embodiment, the present invention pertains, in part, to electronic circuits capable of controlling and modulating the arc current in a lamp. The circuits include means to draw power from a direct or alternating (utility) source. The circuits further include means to control or limit the magnitude of the current flowing in a lamp or collection of lamps. The circuits further include means to vary the current in the lamp to encode information in the lamp light with no visible flicker or other distracting optical phenomena. The present invention further pertains, in part, to electronic circuits capable of receiving or detecting the output of a lamp. These circuits may include means to detect different features including colors, intensities, and modulations of transmitted light or radiation. These circuits may be tunable by a user or by automatic electronic means, including an on-board computer in the receiver, to alter their reception characteristics. They may receive or analyze multiple features simultaneously. They may include substantial computational capability to derive or compute new information from the detected signal or signals, including position, range, and angular orientation with respect to fixed or moving reference points that contain transmitters. These receivers may additionally include other communications capabilities, i.e., Bluetooth, RF, 802.11 or "WiFi," and other communications path for relaying information to other computing or receiving devices, including a tethered desktop computer or server, or other handheld or mobile computing devices.

By "lamp", as that term is used herein, it is meant a device that produces radiated transmissions, including, but not limited to, infra-red, visible, and ultra-violet light, in response to an input electrical current which flows in the lamp. A typical example is a fluorescent lamp, although other types, such as high-intensity discharge lamps, light emitting diodes (LEDs), and other solid-state illumination sources, are also intended. Emitters of other types of radiation, such as radio antennae for applications in RADAR or RADAR jamming sets, for example, are also intended.

By "ballast", as that term is used herein, it is meant a circuit that controls the amplitude, frequency, and phase of the current waveform in, or the voltage waveform applied to, the lamp or multiple lamps. One or more of these features (amplitude, frequency, or phase) may be controlled simultaneously.

By "rectifier", as used herein, it is meant a circuit that takes as input a voltage waveform from a power source and produces a DC or predominantly DC output voltage waveform.

By "inverter", as used herein, it is meant a circuit that takes as input a low frequency or DC electrical voltage waveform from a power source. The inverter produces a high frequency voltage waveform that can be applied to the lamp, or a lamp in combination with other electrical components such as inductors or capacitors. The frequency and phase of this output voltage waveform can be controlled by the inverter.

By "switch", as used herein, it is meant a device that can either block or permit the flow of electric current in response to a low-power-level control signal. Typical examples of a switch include a bipolar junction transistor, a MOSFET, or an insulated-gate bipolar junction transistor (IGBT).

By "load", as used herein, it is meant a lamp or lamps, possibly in combination with other electrical components including inductors, capacitors, resistors, and transformers, which are added to ensure that proper and safe operating voltages and currents are, or can be by virtue of control actions taken by the inverter, applied to the lamp or lamps. Typically, the load is connected to the output of an inverter.

By "color" (nu) or "color frequency" is meant the inherent frequency of the photons emitted by the transmitter. The color frequency is related to the wavelength lambda of the photons by the equation c=nu*lambda where c is the speed of light.

By "carrier" or "carrier frequency" is meant the base frequency or average frequency with which the light is modulated in the absence of signal being transmitted. Without intending to be limiting, for fluorescent lights, this is normally in the range 25 Hz to 250 kHz and for high efficiency fluorescent lights, this is normally in the range 20 kHz to 250 kHz.

By "modulation frequency" is meant the variation in amplitude, frequency, or phase around this carrier frequency which is superimposed upon the carrier frequency to enable a signal to be transmitted.

By "electrical current frequency" is meant the frequency of the alternating current powering the illumination source. Since alternating current involves a periodic change in the direction of flow of current, the electrical current frequency represents the number of times in a given period of time that the current is observed to display a nominal peak flowing in the same direction.

In one embodiment of the invention, a system that is capable of controlling the current in a discharge or fluorescent lamp is provided. A rectifier circuit is used to draw power from the AC utility. The current drawn from the AC utility by the rectifier circuit is actively controlled to have the same shape and phase, but possibly a different amplitude, as the AC utility voltage waveform, ensuring near-unity-power-factor operation. The power drawn from the AC utility is used to create a predominantly DC output voltage with little alternating or ripple voltage. The DC voltage may serve as the input to an inverter circuit.

In various aspects, the inverter circuit draws power from the DC bus and creates a high frequency alternating waveform that can be applied to the lamp, or the lamp in combination with other electrical components including transformers, inductors, or capacitors. For example, the inverter can be used to apply an AC square wave to the primary of a transformer whose secondary is connected to a series combination of an inductor and a capacitor and lamp in parallel. The inverter circuit includes special means to vary the frequency of the voltage produced by the inverter circuit. The frequency can, for example, be varied to encode information in the output voltage waveform and, therefore, the light produced by the lamp. To maximize efficiency, the inverter may be operated with zero-voltage switching. For example, switches are turned on only when the voltage across the switch is zero, ensuring a nearly lossless turn-on transition.

In another embodiment, the inverter circuit could be energized directly by a DC or low frequency alternating power source, eliminating the need for a rectifier circuit. This mode of operation is particularly attractive in environments, e.g., automobiles or other transportation systems, where DC power is available a priori. Again, the inverter circuit can include special means to vary the frequency of the voltage produced by the inverter circuit. The frequency can, for example, be varied to encode information in the output voltage waveform and, therefore, the light produced by the lamp. Again, to maximize efficiency, the inverter may be operated with zero-voltage switching. For example, switches are turned on only when the voltage across the switch is zero, ensuring a nearly lossless turn-on transition.

In various embodiments, a receiver can be constructed which remotely samples the lamp light from a distance, decodes the information in the light encoded by the ballast, computes the position location of the receiver, potentially communicates this information or other information based on the received signals using a wireless network connection, and potentially accesses other stored information or computation algorithms to be applied based on or using the received information.

BRIEF DESCRIPTION OF THE DRAWING

FIG. 1 shows the light intensity from a fluorescent lamp tube as a function of lamp position and current frequency measured in an experiment relating to one embodiment of the invention;

FIG. 2 shows a block diagram of a multi-frequency dual-use ballast according to another embodiment of the invention;

FIG. 3 shows a boost power factor correction rectifier circuit suitable for use as a power front-end in a ballast of one embodiment;

FIG. 4 shows an inverter circuit suitable for use in a multi-frequency dual-use fluorescent lamp ballast according to another embodiment;

FIG. 5 shows the receiver front-end for an optical receiver in one embodiment, capable of determining position location;

FIG. 6 shows one possible embodiment for using multiple receiver front-ends to determine position location; and FIG. 7 shows position location using additional receiver front-ends to determine position in another dimensional axis according to yet another embodiment of the present invention.

DETAILED DESCRIPTION OF THE INVENTION

The present invention provides a system that transmits information over a wireless data pathway, comprising an information transmitter with at least two different modes for transmitting the same information using different carrier (e.g., colors) or modulation frequencies or intensities or a combination of these.

In one embodiment, which is provided to be illustrative but not limiting of the possible applications of our multi-frequency dual-use transceiver set invention, fluorescent lamps and ballasts may be used as transmitters, and an electro-optical circuit may be used as a receiver to recover information from the light.

During the course of experiments with fluorescent lamps (for example, but without limitation, a typical linear fluorescent lamp tube,) these lamps have shown that, when energized, they emit different colors of light with varying intensities and modulation frequencies along the length of the bulb. The term "colors" as used here may refer not only to visible light but also to infrared light or other "colors" invisible to the human eye. Different physical processes in the lamp cause intensity variations in the different colors created by the bulb. These processes are described, for example, in the book "Electric Discharge Lamps" by John Waymouth, which is incorporated herein in its entirety by reference. By design, these colors may "fuse" under observation of a human observer, creating the illusion of a white lamp, for example. However, the intensity and color variations can be recovered or detected by an appropriately configured electronic sensor or sensors. Furthermore, in a lamp energized with an alternating current, the different colors of light may be modulated by multiples of the frequency of the alternating current. Light richer in infrared wavelengths, for instance, may be predominantly (but not exclusively) emitted at the alternating current frequency and near the ends of the lamp. Light richer in visible wavelengths may be predominantly (but not exclusively) emitted at twice the alternating current frequency near the center of the lamp.

Infrared light from fluorescent lamps has been known to interfere with remote control devices for televisions and other appliances. Significant design effort is often taken to make sure that lighting systems and remote controls can coexist in the same venue. Often therefore, variations in the color, intensity, and modulation frequency of emitted light are viewed by lighting designers and others as a nuisance.

Contrary to this point of view, the variations in color, intensity, and modulation frequency can have great utility in a dual-use system. These variations provide redundant information transmission channels, which, among other applications, can enhance the reliability of a dual-use communications network. Because the variations may be distributed in a known or predictable or measurable pattern around a lamp, it is possible to use electronic observations of these variations to determine range, angular position, location in a grid of lights, and other location or locating information to determine an observer's position with respect to the lamp or lamps. These observations and techniques are not limited to fluorescent lamps. For example, but without limitation, one skilled in the art may construct a solid-state illumination source using light emitting diodes (LEDs) with different colors and different spatial distributions to create a solid-state lamp or lighting panel that appears to provide uniform illumination to the human eye, but which in fact provides electronically detectable variations in color, intensity, and modulation frequency that can be used for dual-use position location, transmission redundancy through multiple channels, or other applications.

EXAMPLE 1

Multi-Carrier Frequency Transmitter Using Faraday Dark Space Effect

When a fluorescent lamp is energized with a DC current, one side or filament of the lamp is the cathode (electron emitter), and the other side of the lamp serves as the anode. A "Faraday dark space" forms in the plasma column in the lamp tube. This Faraday dark space is described in the Waymouth reference as a "comparatively nonradiating region" compared to the central plasma column. This dark space or "hole" in the plasma column permits infrared light to escape in substantially greater relative quantities from the lamp tube in comparison to the central plasma column. This "dead zone" or Faraday dark space in the charge column is a consequence of the ambipolar diffusion (ionized or plasma charge flow) in the rarefied gas in the lamp tube.

The lamp may be and typically is operated with an alternating or AC excitation. This means that each side of the lamp is a cathode and then an anode for each period or cycle of operation. Older lamps cycle at 60 Hertz. Modern lamps operated with switching power electronic ballasts can operate at much higher frequencies, achieving alternations as high as 100 kHz. The phosphors in the lamp respond or glow in response to the magnitude of charge present in the lamp, regardless of current direction. This means that the center column of a linear bulb will exhibit a flicker in its light output at a frequency twice that of the alternation of the current. Hence, if the current in the bulb, for example, is alternated at 32 kHz, the visible illumination from the center of the bulb will vary between a maximum and a minimum value at a flicker rate of 64 kHz. These frequencies are all far above the ability of the human eye to perceive, so the lamp appears to create a steady illumination.

Either end of the bulb, however, will be a cathode and then an anode once each cycle. Hence, each end of the bulb will host or create a Faraday dark space once per operating cycle. Illumination flicker due to the Faraday darkening will occur at the same frequency as the variation of the lamp current, e.g., 32 kHz in this example.

The flickering associated with the charge column at twice operating frequency generally tends to appear in the output of a phosphor-coated lamp in the visible light frequencies. The base frequency alternation of the Faraday dark space, however, tends to create an illumination output in the infrared illumination range (see, for example, "Fluorescent Lamp Phosphors," by K. H. Butler which is incorporated herein in its entirety by reference). Data is shown in FIG. 1. The histograms in FIG. 1 indicate that a "1×" light output varying in intensity at precisely the lamp current frequency dominates the light output near the ends of the bulb. Near the center of the bulb, a "2×" light output varying in intensity at twice the lamp current frequency dominates near the center of the bulb. Similarly interesting and useful distributions of light color and modulation frequency occur in circular tubes, u-shaped tubes, and other fluorescent lamps.

Because the bulb exhibits light output at several different frequencies with respect to the arc current, and with different light intensities depending on the observed position along the lamp tube, the lamp can serve as a multi-frequency, dual-use transmitter. Multiple, redundant channels of information are provided from the lamp, which can be used to improve the reliability and "jam resistance" of the receiver. A receiver looking for the same information from multiple colors or channels of light can be more reliable than a receiver operating on a single channel. Because the fluorescent lamp dual-use signal provides a reasonably high radiated power (compared to small signal level optical transmitters like TV remotes) at a known, "fingerprint" oscillation frequency, it is even possible to detect a one or multiple frequency dual-use transmitter outdoors in a bright, sun-lit environment. Also, the geometric arrangement of the light intensity variations along the length of the lamp tube can be used to create a position location system.

The multi-frequency characteristics of the multi-frequency dual-use fluorescent lamp transmitter are useful for avoiding false guidance signals inside buildings due to mirrors. A simple optical receiver receiving a guidance message by decoding a single transmitted color of light can give misleading directions to a user due to the presence of mirrors in a building. For example, during trials with blind users, we have found that indoor guidance systems using a dual-use transceiver set can give incorrect instructions in the presence of a mirror. In one case, the intended application of the transceiver set was for a blind user to point his receiver at a light and receive a guidance message to a destination, such as "turn left here." In the presence of a mirror, the blind user received a reflected signal from a mirror opposite the light, causing the user to turn in the wrong direction. With a multi-frequency dual-use transceiver, we are able to ameliorate this problem. Mirrors have different degrees of efficiency in reflecting different colors of light, e.g., infrared and visible light. A receiver examining or watching only a single transmitted frequency cannot distinguish a reflection from a difference in direct range to the actual transmitter. A carefully designed multi-frequency receiver can detect ratios of received signals in infrared and visible light, and use deviations from nominal ratios to detect the difference between direct and reflected signals. The receiver can then provide appropriate feedback to the user, e.g., provide no signal from a reflection due to a mirror, or perhaps notify the user that he is facing a mirror.

This exemplary embodiment of a multi-frequency, dual-use transmitter using a fluorescent lamp should in no way be considered limiting. One skilled in the art can also create an arrangement of solid-state lights, or LED's, for example, with different output colors and different physical locations along the length of a solid-state light fixture. This arrangement would mimic the effective light output of a fluorescent tube, or any other useful multi-frequency dual-use arrangement. Analogous arrangements could be created for radio-frequency (RF) antennas, which could, for example, providing "blanket" jamming "illumination" in the RF spectrum at some frequency or frequencies, and also provide dual-use information transmit and receive capabilities.

EXAMPLE 2

Multi-Carrier Frequency Transmitter Electronics

Electronic circuits for driving various transmitting elements, e.g., solid-state LEDs, RF antennas, or discharge lights are well known and numerous in the existing art. To assemble a multi-frequency dual-use transmitter, one skilled in the art would use these electronic circuits as building blocks, with appropriate analog or digital control, to coordinate transmissions of the multiple carrier frequencies with copies of the transmitted information. In one embodiment, fluorescent lamps are used, which is intended to be illustrative but not limiting. This embodiment takes advantage of the Faraday dark space effect in a fluorescent lamp to provide simultaneous data transmission on a least 1× and 2× frequencies with respect to the arc current frequency.

In this one of many possible embodiments, transmission is accomplished by modulating or varying the frequency of the alternating current in an electric discharge lamp such as a fluorescent lamp. An overview of an example transmission system of the invention, appropriate for use with a fluorescent discharge lamp, is shown in FIG. 2. In the particular example of discharge lighting, a typical discharge lamp requires a relatively high starting or striking voltage across its terminals to form an arc or electric discharge in the lamp. Once the arc forms, it is essential to reduce the voltage across the lamp, lest an excessive current flow through the lit lamp, destroying it. The purpose of an electronic lamp ballast is at least two-fold, therefore. The ballast must provide an adequately high voltage to initiate arc formation and light production. After starting, the ballast serves to limit the current through the lamp, ensuring satisfactory light production and long lamp life. The present invention may add a third function to the ballast. A means can be provided to vary the frequency of the lamp current to encode information for multi-frequency transmission in the lamp light. In the case of the fluorescent lamp, multi-frequency transmission is accomplished by exploiting the Faraday dark space in the lamp. To exploit the multi-frequency possibility of the lamp, care must be taken to make sure that the luminaire or lamp fixture employed permits the escape of illumination from the key generating regions of the bulb, e.g., the ends and middle of the lamp. A fixture that covers up the ends of the lamp, for example, may limit or eliminate the utility of the Faraday dark space.

The ballast draws power from an alternating (in a building) or direct current (in a bus or other transportation system, for example) electric power source. This power is processed by a rectifier pre-regulator circuit, which may perform several functions, including actively wave-shaping the input current to provide near unity power factor operation. The rectifier also provides a DC output voltage or DC link that serves as the input to the next stage in the ballast, an inverter. It should be noted that there are a wide range of possibilities for implementing this rectifier stage, including diode bridge rectifiers, diode bride rectifiers with passive component filters, and actively controlled pre-regulator circuits designed around well known power electronic switching power supplies such as the buck, boost, or flyback converters. An example of an active rectifying stage based on the boost converter is shown in FIG. 3. This stage might or might not provide safety isolation by incorporating a transformer, as needed. It might also be a very simple stage, consisting of as little as a capacitor or simply a pair of connecting wires if the ballast is to operate from a DC source voltage, as might be the case in a transportation system such as an automobile or bus, where a 12 volt DC supply is conveniently available.

The inverter circuit operates from the DC link voltage provided by the rectifier. The inverter acts to create a high-frequency AC voltage waveform to be applied to a load circuit that includes one or more lamps. There are a tremendous number of inverter circuit topologies and switching schemes that could be used for this application.

An important feature of the ballast design is the addition of modulation circuitry to modify the behavior of the timing circuitry to permit frequency modulation of the inverter AC waveform. Carefully chosen modulation schemes permit the encoding of information for transmission at the highest possible bandwidth or data rate while ensuring that the lamp light exhibits no flicker or other distracting optical phenomena perceptible to the eye regardless of the information content of the transmitted data. This information could come from any source of analog or digital waveforms, including, for example, audio signals from a compact disc, ROM memory, tape recorder or microphone or digital data from a computer, disk drive, or power line carrier modem.

The inverter block shown in FIG. 1 is used to drive a load circuit that consists of a lamp and possibly other electronic elements such as inductors, capacitors, and/or transformers. An inductor and capacitor in this load can serve as a high quality factor ("Q") resonant circuit when the lamp is off, i.e., before the arc strikes. The resonant circuit can therefore provide significant striking voltage if the inverter frequency is near the resonant frequency. Once the lamp strikes, the lamp effectively dominates the combined impedance of the capacitor/lamp pair, and an inductor serves to limit the current flowing through the lamp in steady-state operation.

To construct a commercial ballast, a system that is capable of controlling the current in a discharge or fluorescent lamp has been designed and developed. A boost-type rectifier circuit with active feedback controlled current wave-shaping, as shown in FIG. 3, is used to draw power from the AC utility. The current drawn from the AC utility by the rectifier circuit is actively controlled to have the same shape and phase, but possibly a different amplitude, as the AC utility voltage waveform, ensuring near unity power factor operation for maximum efficiency and power utilization. The power drawn from the AC utility is used to create a predominantly DC output voltage with little alternating or ripple voltage. The DC voltage produced by the rectifier serves as the input to an inverter circuit, represented by the box labeled "P" in FIG. 3.

A simplified schematic of the inverter portion of the ballast, according to this example, is shown in FIG. 4. It is composed of a half-bridge connection of power transistors and the aforementioned resonant circuit. The half-bridge connection is a one of several standard topologies used for lamp ballasts.

Safety isolation between the utility voltage and the lamps, provided by transformer T1, prevents the user from receiving an electrical shock if he should touch one end of the lamp while the ballast is energized. A separate resonant circuit (L1 C1 and L2 C2) is provided for each lamp. An inverter for a two-lamp ballast is also illustrated in FIG. 4, but this is not intended to be limiting. The inverter could be reduced to drive a single lamp. More than two lamps may be driven, for example, by adding more resonant circuits. We have also found that a ballast with communication capability may be mixed in the same lamp fixture with a conventional ballast or ballasts, permitting a lighting designer to select the number of lights in the fixture that are "dual use".

The connection of the resonant capacitor through the filaments of the lamp serves the dual purpose of heating the filaments before the lamp strikes and breaking the resonant circuit if a lamp should be removed. With the resonant circuit broken, the voltage at the lamp terminals is a well-controlled value, and can be made safe. Furthermore, it is possible to sense that the lamp has been removed and shut down the ballast.

The switching of the power transistors is dictated by a microcontroller, a simple single chip computer, and its associated circuitry. When the ballast is energized, the microcontroller verifies that all lamps are present, and if so starts switching the power transistors alternately at a 50% duty cycle and at a frequency much higher than the resonance of the resonant circuit. It reduces the frequency in steps, first preheating the lamp filaments, and then striking the lamps as the resonant frequency is approached. After the lamps have ignited, it changes the oscillation frequency to the unmodulated steady state running frequency. During the whole start process and while running, the control circuitry checks for erroneous conditions: excessive current in the power transistors, lamp removal, and failure of a lamp to ignite. If any such condition is detected, the inverter is shut down to prevent damage to itself and/or danger to the user. Once the lamps have been ignited, the control circuitry accepts input from the modulation source. In the case of analog audio input, it continuously modulates the inverter frequency proportionally to the amplitude of the modulation source. The receiver in this work is an audio receiver, however if the ballast were configured for data transmission, the frequency can be modulated with a two or three step coding scheme, or any number of well known digital coding schemes extant in the art. Some examples, with special considerations for making the light output free to the human eye of flicker and other distracting optical phenomena and hence enabling "dual-use", are discussed in U.S. Pat. Nos. 6,198,230, 6,426,599 and 6,794,831, which are incorporated herein in their entirety by reference.

EXAMPLE 3

Multi-Carrier Frequency Receiver for Position Location

U.S. Pat. No. 6,504,633 which is incorporated herein in its entirety by reference, discloses techniques and circuits for receiving and decoding information in optical signals transmitted by a dual-use fluorescent lamp transmitter. A multi-sensor receiver has been used to consider a variety of techniques for determining the precise position or location of a receiver of the present invention, among many other possible applications.

The utility of this information is immediate. A person with a receiver as disclosed herein could be quickly guided through a mall, museum, or theater. Automatic guided vehicles, which currently require carefully planned and marked ground paths in factories and commercial facilities, could receive guidance information from overhead fixtures. The location of wayward children or wandering hospital patients could be quickly determined by a "minding" system employing position locators.

The "front-end" of a receiver capable of position locating could employ one or more optical sensors, e.g., one or more phototransistors, photodiodes, or a CCD or CMOS photo-optical array, which essentially provides many optical sensors on an integrated package. One of many possible approaches to designing such a receiver front-end is illustrated schematically in FIG. 5, which employs a single phototransistor or optical receiving element, but two signal processing paths to reasonably separate the 1× and 2× modulated light received by the optical element. Two or more distinct phototransistors or optical receiving elements could also be employed for this task.

A conventional receiver system is fed by the filtered output of the optical sensor. In FIG. 5, the data recovery block is fed by the 1× light intensity signal. (1× frequency refers to the intensity variations created by the alternating lamp current and not, for example, the light frequency or color.) Either the 1× or 2× output can be used for data recovery, and receivers have been developed that use either path. The recovered data provides the "information network" component of the system. This data could be pre-recorded or paging messages, audio information, or a serial number indicating the particular light fixture. For locating applications, serial number information may be available, either by itself or encoded in the data stream with other information of interest to the user.

For locating applications, we enhance the conventional receiver with additional elements, for example as shown in FIG. 5. Both the 1× and 2× intensity variations, indicated as variables $I1x$ and $I2x$, will be measured by the locating receiver. A simple lens can be used to focus the optical sensor to a fairly well-defined spot smaller that the size of a transmitting lamp. This lens or lens system could also be integrated as microlenses on a CCD, CMOS, or microelectromechanical (MEMS) sensor array. The "sensor fusion" block could be a digital or analog computation circuit, including but not limited to a microprocessor. This block combines the two intensity signals to produce a composite intensity signal, Ia, for sensor A. The equation indicated in FIG. 5 is an example. Any convenient combination or function of received data could be computed by the sensor fusion block, and limitless possibilities are available to one skilled in the art. For the example shown, as the sensor is swept along the length of the bulb, a signal like Ia varies qualitatively as shown at the bottom of FIG. 1. With appropriate offset c and appropriate scaling constants a and b, the signal Ia is at first negative when the sensor is focused on one end of the bulb. Then, at the middle of the bulb, Ia is positive. Finally, Ia returns to a negative value at the other end of the bulb. The offset c shown in FIG. 5 can be used to adjust the minimum value of the sinusoidal-type curve shown in FIG. 1.

With one or more optical sensor front-ends, the receiver set of various embodiments could be used to locate position. Applications of various position sensing receivers are described in U.S. Pat. Nos. 6,400,482, 6,954,591 and U.S. patent application Ser. No. 10/617,082 which are incorporated herein in their entirety by reference. In the instant invention, and in this example embodiment, the possibility of position location using multi-frequency transmissions in a dual-use transceiver set is considered. First, locating position in one dimension, x, as shown in FIG. 6 is considered, and then the approach to two dimensions is generalized, as is demonstrated in the following embodiments.

FIG. 6 illustrates a scenario in which an automatic guided vehicle (AGV) is attempting to locate its position on the "x-axis" as it passes under a bank of flickering lights along the "long" axis of a collection of overhead fluorescent lamp tubes. The physical dimensions and arrangement in FIG. 6 are presented to make the discussion concrete and understandable—they do not limit the generality of this approach to other installations with different lighting geometries. The AGV in FIG. 6 contains at least two receiver front-ends oriented along the x-axis, with adequate optics to tolerate variations in y-axis position. As the AGV moves under the lights along the x-axis, the A and B sensors alternately acquire the light fixtures, providing either the sine-type pulse familiar from FIG. 1 when under or just before a light, or no signal when the complimentary condition, i.e., just before a light or under a light, occurs. In FIG. 6, sensor A is oriented to look ahead, and sensor B is oriented to look above. The associated intensity signals Ia and Ib are illustrated schematically in FIG. 6. Analog or digital electronics could be used to combine these two signals to create the third trace shown at the bottom of FIG. 6. This trace experiences minima when the cart is under a light, and maxima when the cart is in between lights. The specific fixture or intervening space can be identified by its serial number. In essence, this approach establishes a "cellular" architecture in which each full period of the Ia+Ib trace is created by a light along the x-axis. The precise location with the "cell" is determined by the amplitude of the Ia+Ib signal.

Of course, the approach can be applied to the y-axis, as shown in FIG. 7, if the AGV contains two other sensors oriented along the y-axis, one looking above and one looking to the side. Another "undulating" intensity signal can be computed which determines the y-axis position of the AGV. Any particular room or facility with a 2-D array of lights will be described in this scheme, overall, by an "egg-carton" shape. The wells or valleys in the egg carton correspond to the location of specific lights. The peaks in the carton correspond to intervening blank space between the lights. By identifying each valley or "cell" center with serial number information encoded in the light, it will be possible to precisely determine the absolute position location of the AGV in the 2-D area.

For a hand-held application, additional sophistication may be needed in the receiver to "normalize" for intensity variations in the z-axis or vertical dimension. A number of approaches are available to perform this function. A "baseline restoration" circuit that normalizes the $I1x$ and $I2x$ signals based on the total light intensity may be used. This circuit is essentially an automatic gain control, well known to one skilled in the art, based on the total light intensity. 3× or 4× frequency intensity signals to normalize for height variations may also be used. The histogram data in FIG. 1 indicates, for example, that 4× intensity varies only slightly along length of the bulb, making it a potentially helpful signal for range determination.

Any number of other variations are possible, and consistent with the instant inventions. Multiple frequency sources of data could be provided, for example, on a combination of RF and optical pathways. Optical pathways with multi-frequency transmission characteristic could be constructed with incandescent lamps, LED's, different types of discharge lamps, or other visible or non-visible illumination sources. It should be realized by those skilled in the art that other, equivalent constructions to implement a transmitter and receiver set which provides dual use of a multi-frequency radiation source, e.g., for illumination and also information and transmission position location such as the embodiments described above, do not depart from the spirit and scope of the invention as set forth in the appended claims.

This application hereby also incorporates by reference in their entirety the contents of the following patent, patent applications and other documents and all the references included or mentioned in this application or in each of these references: U.S. Pat. No. 6,198,230, "Dual Use Electronic Transceivers for Wireless Data Networks" issued Mar. 6, 2001; U.S. Pat. No. 6,400,482, "Communication Systems", issued Jun. 4, 2002; U.S. Pat. No. 6,426,599, "Dual Use Electronic Transceivers for Wireless Data Networks, issued Jul. 30, 2002; U.S. Pat. No. 6,504,633, "Analog and Digital Receivers for Dual Use Wireless Data Networks, issued Jan. 7, 2003; U.S. Pat. No. 6,794,831 "Non-Flickering Illumination Based Communication" issued Sep. 21, 2004; U.S. Pat. No. 6,954,591 "Non-Visible Communication System" issued Oct. 11, 2005; U.S. Pat. No. 7,016,115 "Communication with Non-Flickering Illumination", issued Mar. 21, 2006; U.S. patent application Ser. No. 09/291,706 "Communication Systems" filed Apr. 14, 1999; U.S. patent application Ser. No. 09/292,126 "Analog and Digital Electronic Transceivers for Dual-Use Wireless Data Networks" filed Apr. 14, 1999; U.S. patent application Ser. No. 09/770,806 "Dual Use Electronic Transceivers for Wireless Data Networks" filed Jan. 26, 2001; U.S. patent application Ser. No. 10/161,458 "Non-Visible Communication System" filed May 31, 2002; U.S. patent application Ser. No. 10/201,378 "Non-Flickering Illumination Based Communication" filed Jul. 23, 2002; U.S. patent application Ser. No. 10/617,082 "Hybrid Optical Communication Network" Filed Jul. 10, 2003; U.S. patent application Ser. No. 10/946,116 "Communication with Non-Flickering Illumination" filed Sep. 21, 2004; U.S. Provisional Patent Application Nos. 60/081,866 "Fluorescent Lamp Digital Transceiver" filed Apr. 15, 1998, 60/108,287 "Visible Lighting Communication System" filed Nov. 13, 1998, 60/115,374 "Visible Lighting Communication System II" filed Jan. 11, 1999, 60/191,725 "Communication Networks" filed Mar. 24, 2000, 60/308,486 "Hybrid Wireless Network" filed Jul. 25, 2001, 60/311,037 "Multi-Element Assistive Network" filed Aug. 9, 2001, 60/326,277 "Dual Use Lighting for Assistive Communications" filed Oct. 1, 2001, 60/338,912 "Modulated Lighting" filed Nov. 26, 2001, 60/337,491 "Spread Spectrum Arc Lighting Communication" filed Nov. 26, 2001, 60/341, 191 "Vehicle Guidance" filed Dec. 7, 2001, 60/353,253 "Optical Communications" filed Feb. 1, 2002, 60/367,393, "Incandescent Light Optical Communication" filed Mar. 25, 2002, 60/402,434, "Communication via Modulated Illumination", filed Aug. 9, 2002, 60/416,357, "Lighting Communication Point, filed Oct. 4, 2002, 60/450,072, "Context Aware Security through Illumination", filed Feb. 25, 2003, 60/476, 876 "Context Aware Assistive Network", filed Jun. 6, 2003, 60/509,735 "Building Energy Conservation Optimization Network" filed Oct. 7, 2003, 60/528,336 "Multiple Device Wireless Network" filed Dec. 10, 2003, 60/528,986 "Context Aware Multiple Device Wireless Network" dated Dec. 12, 2003, 60/553,614 "Active Rejection Circuits" dated Mar. 15, 2004, 60/599,181 "Context Aware Networks" dated Aug. 5, 2004, 60/704,799 "Multi Component Networks" dated Aug. 2, 2005, 60/794/188 "Assistive Technology", dated Apr. 21, 2006, 60/794/674 "Assistive Technology" dated Apr. 24, 2006; PCT Application Nos. WO00/30415 "Communications Systems" published May 25, 2000, WO99/53633 "Analog and Digital Electronic Transceivers for Dual-Use Wireless Data Networks" published Oct. 21, 1999, and WO99/ 53732 "Dual-Use Electronic Transceiver set for Wireless Data Networks" published Oct. 21, 1999.

Further incorporated herein are the following publications: Leeb, S. B. et al., "Assistive Communication Systems for Disabled Individuals using Visible Lighting," 15th *International Conference on Technology and the Disabled*, Mar. 24, 2000; Jackson, Deron K. et al. "Fiat Lux, A Fluorescent Lamp Transceiver", *IEEE Transactions on Industrial Applications*, vol. 34, No. 3, pp 625-630, May/June 1998. D. T. Burke, S. B. Leeb, R. T. Hinman, E. C. Lupton, J. Burke, J. C. Schneider, B. Ahangar, K. Simpson, E. A. K Mayer, "Using Talking Lights to Assist Brain-Injured Patients with Daily Inpatient Therapeutic Schedule", J. Head Injury Trauma, 16, 3, 284-291 (2001); R. T. Hinman, S. B. Leeb., A. Avestruz, E. C. Lupton, B. L. Bentsen, R. Easton, "Dual Use Lighting for Assistive Communications", 2002 NFS Design, Service and Manufacturing Grantees and Research Conference, January 2002 (on CD); A. Avestruz, E. C. Lupton, R. T. Hinman, S. B. Leeb and A. Culkin, "Smart Markers for In-Depth Battlefield Information: Optical and Hybrid Communication", 23rd Army Science Conference, Orlando Fla., December 2002; A. Avestruz, E. C. Lupton, R. T. Hinman, S. B. Leeb and G. Livshin, "Smart Markers for In-depth and Perimeter Security Information using Optical and Hybrid Communica-tions", IEEE Conference on Technologies for Homeland Security, Spring 2003; G. Livshin, A. Avestruz, R. T. Hinman, S. B. Leeb and E. C. Lupton, "Context Aware Security Based on Illumination (CASI)", IEEE Conference on Technologies for Homeland Security, Spring 2003; R. T. Hinman, E. C. Lupton, S. B. Leeb, A. Avestruz, R. Gilmore, D. Paul and N. Peterson, "Using Talking Lights Illumination Based Communication Networks to Enhance Word Comprehension In Subjects who are Deaf or Hard-of-Hearing", Am. J. Audiology, 12, 1, 17-22 (2003); R. T. Hinman, A. Avestruz, E. C. Lupton, G. Livshin, J. I. Rodriguez, S. B. Leeb, C. M. Clark, K. J. Horvath and L. Volicer, "Illumination Based Locator assists Alzheimer's Patients", Pervasive Computing, 3, 2, p 49 (2004); A. Avestruz, J. I. Rodriguez, R. Hinman, G. Livshin, E. C. Lupton and S. B. Leeb., "Stability Considerations Performance of Wide Dynamic Range, Ambient Light Active Rejection Circuits in Photodiode Receivers", Proceedings of the 2004 American Control Conference, Boston Mass., June 2004; J. Waymouth, *Electric Discharge Lamps*, MIT Press, Cambridge, Mass., 1971; M. Dachs, "Optical Communication System," U.S. Pat. No. 3,900,404, August 1975; K. King, R. Zawislak, and R. Vokoun, "Boost-Mode Energization and Modulation Circuit for an Arc Lamp," U.S. Pat. No. 5,550, 434, August 1996; M. Smith, "Modulation and Coding for Transmission using Fluorescent Lamp Tubes," U.S. Pat. No. 5,657,145, August 1997; T. Gray, "Transmission System," U.S. Pat. No. 5,635,915, June 1997; K. Uehara and K. Kagoshima, "Transceiver for Wireless In-Building Communication System [sic]," U.S. Pat. No. 5,424,859, June 1995; T. Buffaloe, D. Jackson, S. Leeb, M. Schlecht, and R. Leeb, "Fiat Lux: A Fluorescent Lamp Transceiver," Applied Power Electronics Conference, Atlanta, Ga., June 1997; E. Bergmann, A. Odlyzko, and S. Sangani, "Half Weight Block Codes for Optical Communications," *AT&T Technical Journal*, Vol. 65, No. 3, May 1986, pp. 85-93; T. Buffaloe, "Fluorescent Lamp Optical Communication Scheme," Advanced Undergraduate Project Report, Department of Electrical Engineering and Computer Science, Massachusetts Institute of Technology, May 1996; W. M. Siebert, *Circuits, Signals, and Systems*, McGraw-Hill, New York, N.Y., 1986; 80C196KC/80C196KD User's Manual, Intel Corporation, Mt. Prospect, Ill. 1992. K. H. Butler, *Fluorescent Lamp Phosphors*, The Pennsylvania State University Press, University Park, Pennsylvania, 1980; A. Wilkins, I. Nimmo-Smith, A. Slater, and L. Bedocs, "Fluorescent Lighting, Headaches, and Eyestrain," *Lighting Research and Technology*, 1989, p. 11-18; L. Laskai and I. J. Pitel, "Discharge Lamp Ballasting," *Tutorial Notes of the IEEE Power Electronics Specialists Conference*, Atlanta, Ga., June 1995; IR2155 Data Sheet, International Rectifier, 1996; Optoelectronics Device Databook, Motorola, 1987; A. Moreira, R. Valadas, and A. M. Duarte, "Characterisation and Modelling of Artificial Light Interference in Optical Wireless Communications Systems," *Proceedings of the 6th International Symposium on Personal, Indoor and Mobile Radio Communications*, September 1995, pp. 326-331.

What is claimed:

1. A system for transmitting information and providing illumination comprising:
   at least one transmitter for transmitting information using a plurality of distinct transmission frequencies and for simultaneously providing optical illumination, wherein the information and illumination do not interfere with one another; and
   at least one receiver for receiving information being transmitted from the at least one transmitter on two or more distinct transmission frequencies
   comprising one single lamp which is generating a plurality of distinct transmission frequencies.

2. The system of claim 1, wherein the receiver is capable of simultaneously receiving information from the transmitter on two or more distinct transmission frequencies
   and in which the receiver receives information on the two or more distinct transmission frequencies transmitted from the single lamp which is generating a plurality of distinct transmission frequencies.

3. The system of claim 1, wherein the illumination has no flicker or other phenomena which is distracting to the human eye
   and in which the illumination which has no flicker or other phenomena which is distracting to the human eye is generated by the single lamp which is generating a plurality of distinct transmission frequencies.

4. The system of claim 1, wherein the transmission frequencies are color frequencies
   and in which the color frequencies are generated by the single lamp which is generating a plurality of distinct transmission frequencies.

5. The system of claim 1, wherein the transmission frequencies are carrier frequencies
   and in which the carrier frequencies are generated by the single lamp which is generating a plurality of distinct transmission frequencies.

6. The system of claim 1, wherein the transmission frequencies are modulation frequencies
   and in which the modulation frequencies are generated by the single lamp which is generating a plurality of distinct transmission frequencies.

7. The system of claim 1, wherein the at least one receiver uses the received information to determine the position of the at least one receiver with to the at least one transmitter
   and in which the at least one transmitter relative to which the at least one receiver is determining position is the single lamp which is generating a plurality of distinct transmission frequencies.

8. The system of claim 1, wherein the at least one receiver simultaneously receives and processes information from two or more distinct transmission frequencies
   and in which the receiver processes information generated by the single lamp which is generating a plurality of distinct transmission frequencies.

9. The system of claim 1, wherein the at least one receiver comprises on-board digital computational capabilities
and in which the receiver processes information generated by the single lamp which is generating a plurality of distinct transmission frequencies.

10. The system of claim 1, wherein the at least one receiver comprises on-board analog computation capabilities
and in which the receiver processes information generated by the single lamp which is generating a plurality of distinct transmission frequencies.

11. The system of claim 1, wherein the at least one receiver comprises a means to transmit received information
and in which the receiver processes information generated by the single lamp which is generating a plurality of distinct transmission frequencies.

12. The system of claim 11, wherein the at least one receiver comprises a computing means to make computations based on the received information; and a means to transmit information
and in which the receiver processes information generated by the single lamp which is generating a plurality of distinct transmission frequencies.

13. The transceiver set of claim 11, wherein the receiver receives the same information on two or more distinct color frequencies of modulated light
and in which the receiver processes information generated by the single lamp which is generating a plurality of distinct transmission frequencies.

\* \* \* \* \*